(12) United States Patent
Simeoni

(10) Patent No.: US 7,154,943 B2
(45) Date of Patent: Dec. 26, 2006

(54) METHOD AND CIRCUIT OF DIGITAL MEASUREMENT OF THE PHASE OF A SINUSOIDAL SIGNAL

(75) Inventor: Patrick Simeoni, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 599 days.

(21) Appl. No.: 10/273,016

(22) Filed: Oct. 16, 2002

(65) Prior Publication Data

US 2003/0072361 A1    Apr. 17, 2003

(51) Int. Cl.
H04B 3/46       (2006.01)
H04B 17/02      (2006.01)

(52) U.S. Cl. ..................................... 375/224; 375/213

(58) Field of Classification Search ..................... None
See application file for complete search history.

(56) References Cited

FOREIGN PATENT DOCUMENTS

EP    0 241 974 A1    10/1987
EP    1 065 622 A1    1/2001

*Primary Examiner*—Chieh M. Fan
*Assistant Examiner*—Cicely Ware
(74) *Attorney, Agent, or Firm*—Lisa K. Jorgenson; Dennis M. de Guzman; Seed IP Law Group PLLC

(57) ABSTRACT

A method for measuring with a maximum error E the phase of a substantially sinusoidal signal, of angular frequency $\omega=2\pi/T$, sampled with a sampling period $T/r$, in which the phase is calculated as the time at which a straight line crossing two consecutive samples located on either side of a median value of the signal reaches said value, including the step of selecting number r from a range included between a value r0 and a value equal to from two to three times value r0, such that:

$$E \geq \max_{t \in [\frac{-T}{r0}, 0]} \left[ t - \frac{T}{r0} \cdot \frac{\text{round}(G \cdot \sin\omega t)}{\text{round}\left(\sin\left[G \cdot \omega \cdot t + \frac{2\pi}{r0}\right]\right) - \text{round}(G \cdot \sin\omega t)} \right]$$

round(x) being the integer closest to a real number x and G being equal to $2^i G_1$, where i is the number of bits on which are coded the samples and where $G_1$ is a term of correction of the amplitude of the sampled signal.

15 Claims, 4 Drawing Sheets

METHOD AND CIRCUIT OF DIGITAL MEASUREMENT OF THE PHASE OF A SINUSOIDAL SIGNAL

BACKGROUND OF THE INVENTION

1. Field of the Invention

The present invention relates to the digital measurement of the phase of an analog signal, and in particular of a substantially sinusoidal variable-frequency signal generated by a read device of an optical disk.

2. Description of the Related Art

Figure 1:
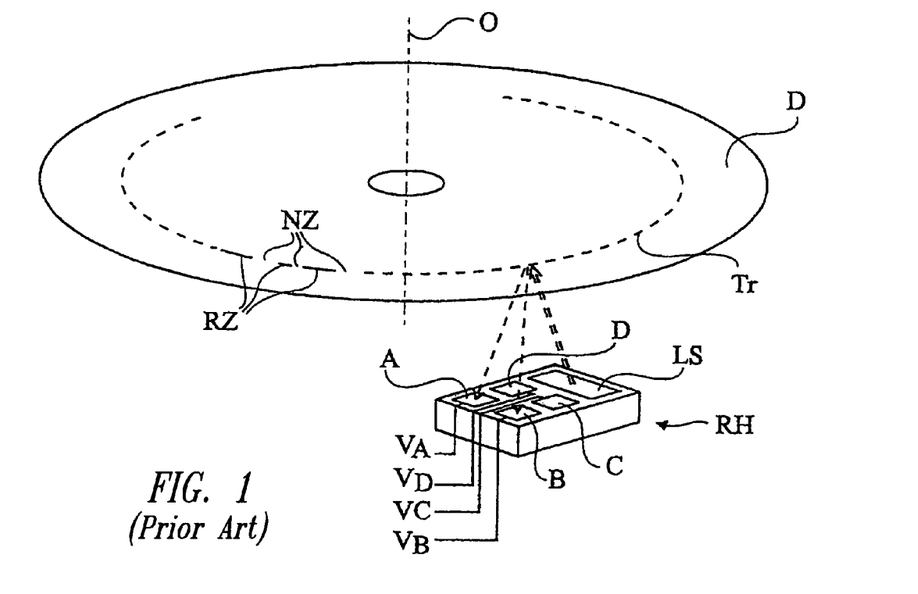
FIG. 1, previously described, schematically shows an optical disk read device.

FIG. 1 very schematically shows a laser disk or optical disk player. A disk D, on a surface of which is engraved a track Tr, is maintained in rotation around revolution axis O of the disk. Track Tr forms a spiral centered on axis O, formed of a series of alternations of reflecting and non-reflecting areas, respectively RZ and NZ. The track may also form concentric circles according to an embodiment which will not be described hereafter. The length of the alternation of reflecting and non-reflecting areas is variable and enables coding information on the track. The disk reader includes a read head RH arranged to face the engraved surface of the disk. A light source LS located on the read head illuminates a point of track Tr. Read head RH is radially mobile with respect to the disk so that any point of the track can be illuminated. Four photosensitive cells A, B, C, and D are arranged on the head to receive light reflected by the track. When the read head is aligned with the track, the four photosensitive cells generate voltage signals $V_A$, $V_B$, $V_C$, and $V_D$ identical in amplitude and phase. The voltage signals substantially follow a sinusoid having its frequency varying along with the length of the halfwaves of reflecting and non-reflecting areas of the track. Frequency F of these signals varies between a maximum frequency Fmax for a minimum length of the halfwaves, and a minimum frequency Fmin for a maximum length of the halfwaves. The analysis of the variations of the frequency of voltage signals $V_A$, $V_B$, $V_C$, and $V_D$ enables finding the information coded on track Tr. When, however, the read head is shifted with respect to the track, the photosensitive cells generate voltage signals $V_A$, $V_B$, $V_C$, and $V_D$ of different amplitudes and out of phase. The phase shift of the voltage signals is then measured and provided to a means for controlling the radial position of the read head (not shown), which acts to realign the read head on the track. The means for controlling the read head position may be realized in the form of an analog or digital circuit. The case where this control circuit uses a digital measurement of the phase shift of the voltage signals generated by the photosensitive cells is considered hereafter.

Figure 2:
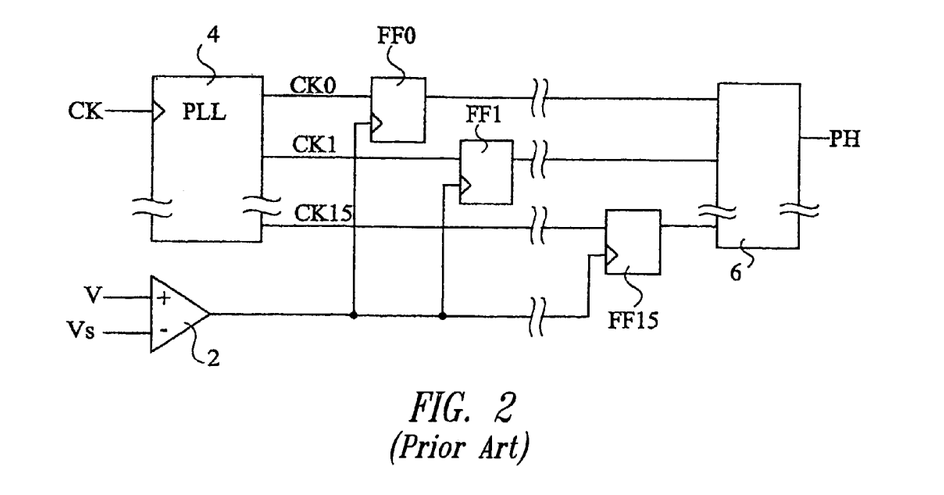
FIG. 2, previously described, schematically shows a conventional phase measurement circuit.

FIG. 2 schematically shows a conventional device used to measure the phase PH of a voltage signal V, generated by one of photosensitive cells A, B, C, and D to digitize this phase at the frequency of a clock signal CK. A similar device is provided to measure the phase of the voltage signal generated by the other photosensitive cells. Means not shown enable subtracting the two phases thus measured. A voltage comparator 2 compares signal V and a value Vs substantially equal to the average value of signal V. A phase-locked loop 4 receives clock signal CK and generates sixteen replicas CK0, CK1, ... CK15 of clock signal CK, mutually shifted by $1/16^{th}$ of the period of clock signal CK. Sixteen D flip-flops FF0, FF1, ... FF15, rated by the output of comparator 2, respectively receive as an input one of replicas CK0, CK1, ... CK15 generated by phase-locked loop 4. A logic block 6 receives the outputs of flip-flops FF0, FF1, ... FF15 and generates as a response a phase signal PH coded over four bits.

Each time signal V reaches value Vs, comparator 2 rates D flip-flops FF0 to FF15. Each D flip-flop FF0 to FF15 then generates a signal equal to 1 or 0 according to whether the replica CK0 to CK15 that it receives is equal to 0 or 1. Replicas CK0 to CK15 being each shifted by $1/16^{th}$ of the period of clock signal CK, a logic processing of the signals generated by D flip-flops FF0 to FF15 enables determining, with an accuracy of $1/16^{th}$ of the period of clock signal CK, at what time after the beginning of a period of clock signal CK signal V has reached value Vs.

Such a device operates satisfactorily, but it requires use of a phase-locked loop or of a like analog structure to generate replicas CK0 to CK15 of clock signal CK. When such a device is realized in the form of an integrated circuit, it may undergo significant modifications for any change in the manufacturing process, which is not desirable. Further, such an analog structure is difficult to test, and it must be evaluated after manufacturing, which is expensive.

To avoid these disadvantages, it appears to be desirable to provide a digital process for measuring the phase of a signal. A digital method consists of sampling the signal of which the phase is desired to be measured and of determining this phase based on the samples so obtained. Conventionally, such a method implies using calculation means or tables which occupy a significant silicon surface area. Algorithms in which the sampled signal is assimilated to a straight line between two consecutive samples may also be used. These algorithms enable making simpler circuits, but it is generally admitted that they require a high sampling rate. The sampling frequency is thus generally chosen to be at least 10 times greater than the frequency of the signal of which the phase is desired to be measured. Now, it is desired to be able to use as small a sampling frequency as possible.

BRIEF SUMMARY OF THE INVENTION

An embodiment of the present invention provides a method for measuring the phase of a substantially sinusoidal signal which can be implemented in the form of a simple digital circuit of small surface area and which can use a sampling frequency only slightly greater than the maximum signal frequency.

According to an embodiment of the present invention, it is provided to measure the phase of a sinusoidal signal by assimilating this signal to a straight line between two samples located on either side of the median value of this sinusoidal signal. A contribution of the present inventor has been to note that the error made can, even if the samples are not very close, be sufficiently small to enable determining the phase of the sinusoidal signal with a predetermined accuracy. One embodiment of the present invention provides a method for determining the minimum sampling frequency that can be used to obtain the desired accuracy and provides choosing a sampling frequency close to this minimum.

An embodiment of the present invention also provides a circuit implementing this method.

More specifically, one embodiment of the present invention provides a method for measuring with a predetermined maximum error E the phase of a substantially sinusoidal signal of variable period T, of angular frequency $\omega=2\pi/T$, sampled with a sampling period T/r, where r is a non-necessarily integral number, in which the phase is calculated as the time at which a straight line crossing two consecutive samples located on either side of a median value of the signal reaches said value, including the step of selecting number r from a range included between a value r0 and a value equal to from two to three times value r0 fulfilling the following relation for all possible values of T, and for t varying over the duration of a sampling period, between −T/r0 and 0:

$$E \geq \max\left[t - \frac{T}{r0} \cdot \frac{\text{round}(G \cdot \sin\omega t)}{\text{round}\left(\sin\left[G \cdot \omega \cdot t + \frac{2\pi}{r0}\right]\right) - \text{round}(G \cdot \sin\omega t)}\right]$$

round(x) being the integer closest to a real number x and G being equal to $2^i G_1$, where i is the number of bits on which the samples are coded, and where $G_1$ is a real term, included between 0 and 1, of correction of the amplitude of the sampled signal.

According to an embodiment of the present invention, the phase calculation includes the steps of:

a/ determining in which half of the sampling period separating said samples the straight line reaches said median value, then delimiting a search interval equal to half the period thus determined, the most significant bit of the binary number being equal to 0 if the search interval is the first half of said period and to 1 otherwise; and b/ repeating a number j−1 of times the step of determining in which half of the search interval the straight line reaches said value, then restricting the search interval to said interval half, a bit of the binary number, less significant than the bit calculated in the preceding step, being equal to 0 if the straight line reaches said value in the first half of the search interval and to 1 otherwise.

One embodiment of the present invention also provides a circuit for measuring, in the form of a binary number of j bits with a predetermined maximum error E, the phase of a substantially sinusoidal signal of variable period T, of angular frequency ω=2π/T, sampled with a sampling period T/r, where r is a non-necessarily integral number, chosen to be included in a range from a value r0 to two or three times this value r0, value r0 fulfilling the following relation for all possible periods of T, and for t varying by the duration of a sampling period, between −T/r0 and 0:

$$E \geq \max\left[t - \frac{T}{r0} \cdot \frac{\text{round}(G \cdot \sin\omega t)}{\text{round}\left(G \cdot \sin\left[\omega \cdot t + \frac{2\pi}{r0}\right]\right) - \text{round}(G \cdot \sin\omega t)}\right]$$

round(x) being the integer closest to a real number x and G being equal to $2^i G_1$, where i is the number of bits on which the samples are coded and where $G_1$ is a real term, included between 0 and 1, of correction of the amplitude of the sampled signal, including:

an initialization cell receiving said sampled signal and providing, when two successive samples are of different signs, the inverse of the absolute value of the first sample on a first output terminal and the sum of the absolute values of the two samples on a second output terminal;

a first calculation cell having first and second input terminals respectively connected to the first and second output terminals of the initialization cell, providing a first output terminal of the first calculation cell with the sum of the value received on its first input terminal and of half the value received on its second input terminal, providing said half to a second output terminal of the first calculation cell, and providing the inverse of the sign of said sum to a third output terminal; and a number j−1 of next calculation cells each having first, second, and third input terminals respectively connected to the first, second, and third output terminals of the preceding calculation cell, providing a first output terminal with the sum of the value received on its first input terminal and of half of the value received on its second input terminal if its third input terminal receives a signal equal to 1 and the sum of the value received on its first input terminal and of the inverse of half the value received on its second input terminal otherwise, providing said half to a second output terminal and the inverse of the sign of said sum to a third output terminal.

According to an embodiment of the present invention, the initialization cell includes:

a D flip-flop rated by the clock signal, receiving said sampled signal;

an X-OR gate receiving as inputs the signs of the values present at the input and at the output of the D flip-flop;

a first multiplexer connected to provide either the output of the D flip-flop or 0, according to whether the output of the X-OR gate is equal to 1 or to 0 and a second multiplexer connected to provide either the input of the D flip-flop or 0, according to whether the output of the X-OR gate is equal to 1 or to 0, the absolute value of the output of the first multiplexer being provided to an element of gain −1 and to a first input of a first adder, the absolute value of the output of the second multiplexer being provided to a second input of the first adder, the respective outputs of the element of gain −1 and of the first adder being connected to a first and to a second output terminals of the initialization cell.

According to an embodiment of the present invention, the first calculation cell includes:

a divider by two having an input connected to the second input terminal of the first calculation cell;

a third multiplexer connected to provide either the output of the divider or its inverse according to whether the signal received by a third input terminal of the first calculation cell is equal to 1 or to 0;

a second adder to add the signals received from the first input terminal of the first calculation cell and from the output of the third multiplexer, the output of the second adder being connected to a first output terminal of the first calculation cell, a second output terminal of the first calculation cell being connected to the output of the divider, the inverse of the sign of the signal generated by the second adder being provided to the third output terminal of the first calculation cell, and the third input terminal of the first calculation cell being maintained at value 1.

According to an embodiment of the present invention, the next calculation cells each have the same structure as the first calculation cell.

According to an embodiment of the present invention, the third output terminals of the first calculation cell and of the next calculation cells respectively provide the most significant bit and the next most significant bits of the searched phase.

According to an embodiment of the present invention, number i is equal to 8, number j is equal to 4, error E is equal to one sixteenth of the sampling period, and ratio r ranges between 3.4 and substantially 10.

The foregoing features of the present invention, will be discussed in detail in the following non-limiting description of specific embodiments in connection with the accompanying drawings.

DETAILED DESCRIPTION OF THE INVENTION

Embodiments of a method and circuit for digital measurement of the phase of a substantially sinusoidal signal are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 4A:
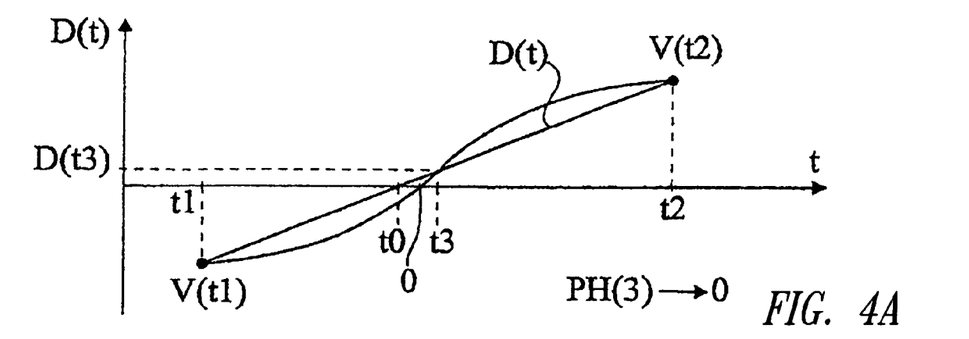
FIGS. 4A to 4D illustrate the implementation of a phase measurement according to one embodiment of the present invention.

For simplicity, it is considered hereafter that the signal to be analyzed is a sinusoidal signal of period T and of angular frequency $\omega=2\pi/T$ varying between a positive voltage and a negative voltage, reaching its median value Vs=0 at a time 0. After sampling, samples V(t) of the sampled signal V may be written as:

$$V(t) = \text{round}(G \cdot \sin(\omega t))$$

where round(x) is the integral value closest to a real number x, and $G=2^i G_1$. Value i is the number of bits on which are coded samples V(t). $G_1$ is a real number, greater than 0 and smaller than or equal to 1, of correction of the amplitude of the sampled signal. Two consecutive samples V(t1), V(t2) located on either side of value. Vs=0 and distant by one sampling period Te, smaller by a real, non-necessarily integral ratio r than period T, are considered. Samples V(t1) and V(t2) are shown in FIG. 4A, which is described subsequently. Considering a straight line D(t) crossing both samples, one has:

$$D(t) = \frac{r}{T} \cdot (V(t2) - V(t1)) \cdot (t - t1) + V(t1)$$

where t2−t1=Te=T/r corresponds to one sampling period. Straight line D(t) reaches value 0 at a time t0 that may be different from time zero. Value t0 corresponds to error $\epsilon$ made when sinusoidal signal V(t) is assimilated to straight line D(t). The present inventor has shown that the maximum error made is, for a predetermined ratio r between the analyzed frequency and the sampling frequency, equal to:

$$\varepsilon_{\max} = \max\left[t - \frac{T}{r} \cdot \frac{\text{round}(G \cdot \sin\omega t)}{\text{round}\left(G \cdot \sin\left(\omega t + \frac{2\pi}{n}\right)\right) - \text{round}(G \cdot \sin\omega t)}\right]$$

for t varying between −T/r and 0. A first step of the method according to an embodiment of the present invention comprises of checking, for a period T and a chosen ratio r smaller than 10, whether the maximum error made $\epsilon_{max}$ is still smaller than a desired maximum value E. It can be shown that the maximum error made $\epsilon_{max}$ remains unchanged when signal V is out of phase and no longer cancels at t=0. According to an embodiment of the present invention, times t1, t2, and t0 are coded in the form of binary numbers of j bits, so that times t0, t1, t2, and errors E and $\epsilon_{max}$ are each expressed by an integral number of $2^{j-th}$ of sampling frequency T/r. Such an embodiment is considered in the rest of the description.

Figure 3:
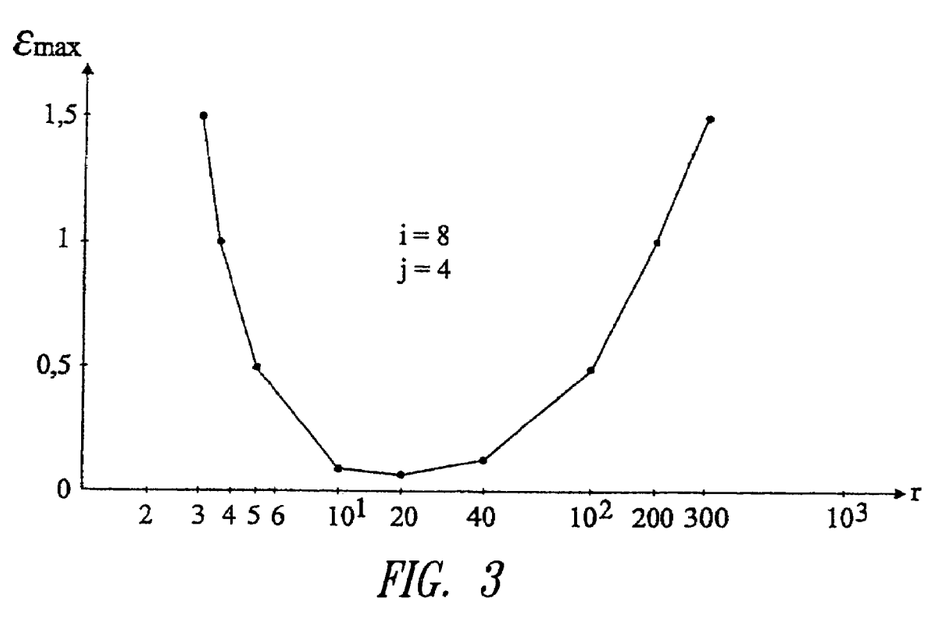
FIG. 3 shows a curve enabling choosing according to one embodiment of the present invention a sampling frequency to measure the phase of a substantially sinusoidal signal.

FIG. 3 shows a curve illustrating, when j is set to 4 and i is set to 8, the variation of the maximum error made $\epsilon_{max}$, expressed in 16-ths of sampling period T/r, according to ratio r. Such a curve enables determining the minimum ratio r for which a phase calculation according to an embodiment of the present invention can be performed.

The error is substantially equal to 1.5 when r=3, to 1 when r=3.4, to 0.5 when r=5, to 0.15 when r=10, to 0.13 when r=20, to 0.17 when r=40, to 0.5 when r=100, to 1 when r=200, and to 1.5 when r=300. Surprisingly, substantially from r=20, the error increases along with ratio r while theoretically, as r increases, the samples come closer and signal V between two samples becomes more and more like a straight line. One embodiment of the present invention has shown that, when ratio r increases, since the sampling period becomes shorter, the measurement of time t0 becomes finer and the maximum committed error $\epsilon_{max}$ represents a larger part of the sampling period. As seen previously, it is attempted in practice to determine the minimum sampling frequency usable for a signal of given frequency. For this purpose, an embodiment of the present invention provides searching the minimum ratio r usable for a maximum desired error E. Considering a signal V of variable frequency, an embodiment of the present invention provides selecting a sampling frequency such that the maximum committed error $\epsilon_{max}$ remains smaller than the desired maximum error E for all possible values of the frequency of signal V.

As an example, FIG. 3 indicates that for a desired maximum error of 1, when j is set to 4, the minimum usable ratio r is 3.4. For security reasons and to prevent possible drifts in the characteristics of the circuit implementing an embodiment of the present invention, a ratio ranging between one and three times this minimum ratio, for example between 4 and 10, will be used. For an optical disk of DVD format for a reading speed of 2.5×, the maximum frequency Fmax of signal V is equal to 10.9 MHz. A minimum sampling frequency Fe of 38 MHz may be used according to an embodiment of the present invention to measure phase PH of signal V. In practice for various embodiments, a frequency ranging between 40 and 100 MHz will be used.

Figure 4B:
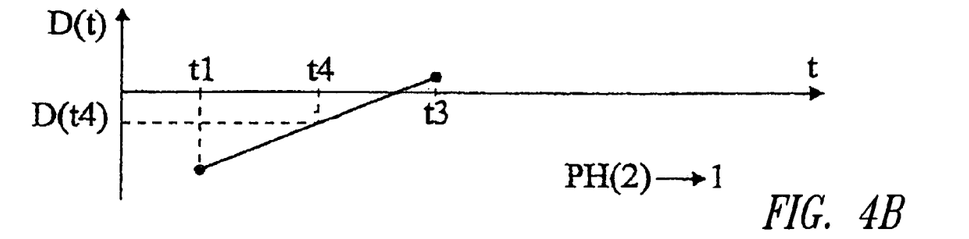
Figure 4C:
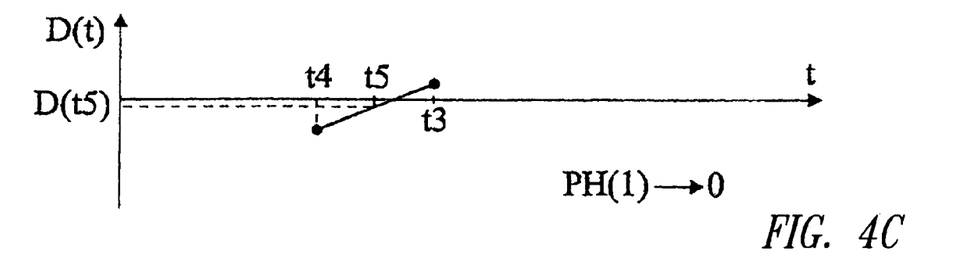

FIGS. 4A to 4C illustrate the implementation of a measurement according to one embodiment of the present invention of phase PH of signal V in the form of a binary number of four bits. Two consecutive samples V(t1) and V(t2) of different signs taken at two sampling times t1 and t2 are considered. An embodiment of the present invention provides calculating the phase as the time t0 at which straight line D(t) crossing samples V(t1) and V(t2) reaches 0. The phase of signal V can be calculated from the values of time t0, of time t1, and of sampling period t2−t1. For simplicity, it is considered hereafter that t1=0, that t2=1, and that time t0 is equal to phase PH of signal V.

FIG. 4A illustrates a first step of determining in which half of the sampling period separating times t1 and t2 straight line D(t) crossing samples V(t1) and V(t2) reaches 0. A value D(t3) of straight line D(t) at a time t3 equal to (t2−t1)/2 is calculated. If value D(t3) is greater than 0, straight line D(t) reaches 0 in the first half of the sampling frequency and the most significant bit PH(3) of the phase receives value 0. The calculation will then be continued on a search interval included between times t1 and t3. In the opposite case (not illustrated), the most significant bit PH(3) of the phase receives value 1. The calculation will then be carried on a search interval between times t3 and t2.

FIG. 4B illustrates a second step of determining in which half of the search interval determined in the preceding step straight line D(t) reaches 0. A value D(t4) of straight line D(t) is calculated at a time t4 located at half of the search interval. If value D(t4) is greater than 0, the second most significant bit PH(2) of the phase receives value 0 and the search interval is restricted to its first half. In the opposite case, the second most significant bit PH(2) of the phase receives value 1 and the search interval is restricted to its second half.

Figure 4D:
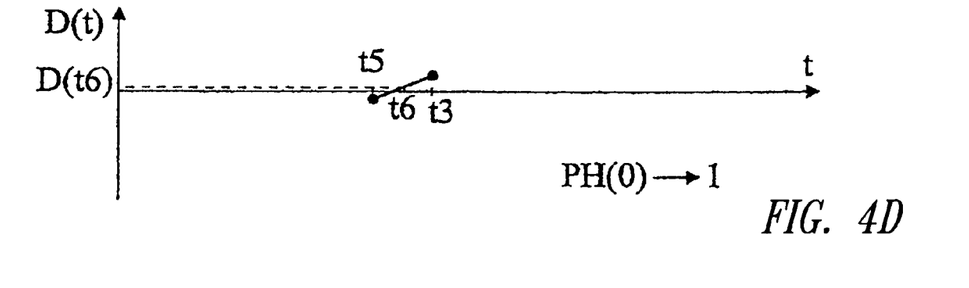

FIGS. 4C and 4D respectively illustrate third and fourth steps each having the same progress as the second step. Values D(t5) and D(t6) of straight line D(t) are calculated at times t5 and t6, each located at half of the search interval determined in the preceding step. The sign of values D(t5) and D(t6) enables giving a value to bits PH(1) and PH(0) of phase PH. In the illustrated example, a phase PH=0101=5 is obtained, meaning that straight line D(t) has reached 0 at the 5/16-ths of the period between times t1 and t2.

Figure 5:
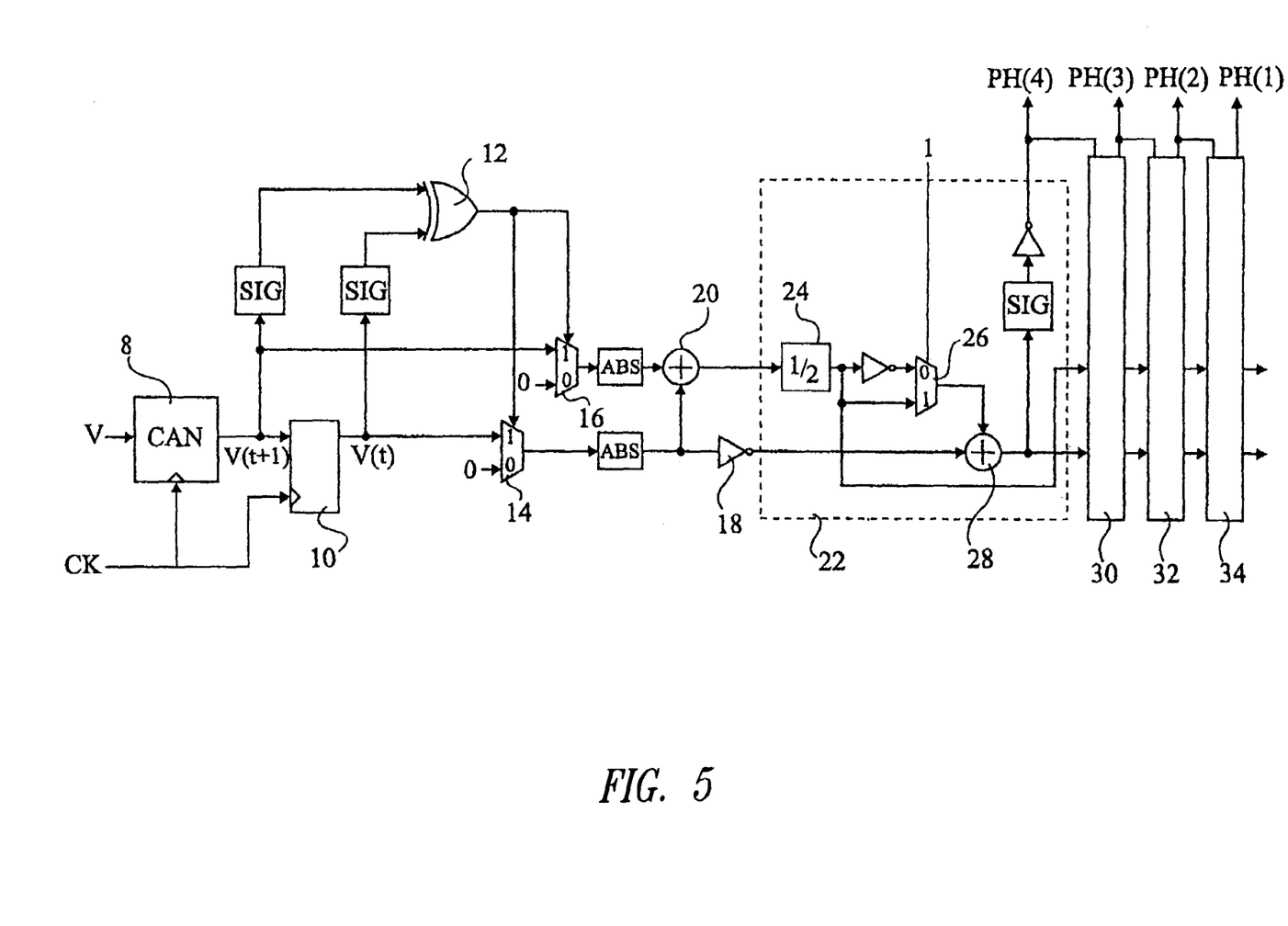
FIG. 5 shows an embodiment of a circuit according to the present invention.

FIG. 5 schematically shows an embodiment of a phase measurement circuit according to the present invention. An analog-to-digital converter 8 over i bits, external to the circuit, samples signal V at the rate of clock signal CK. The output of the analog-to-digital converter, coded in signed binary, is provided to a D flip-flop 10 rated by clock signal CK. Two consecutive samples V(t) and V(t+1) are thus permanently present at the output and at the input of flip-flop 10. The signs of samples V(t) and V(t+1) are provided to the input terminals of an X-OR gate 12. A multiplexer 14 receives value 0 on a first input and sample V(t) on a second input. A second multiplexer 16 receives value 0 on a first input and sample V(t+1) on a second input. Multiplexers 14 and 16 are connected to the output terminal of gate 12, to output values V(t) and V(t+1), respectively, when these values have different signs, and zero values otherwise. The absolute value of the output of multiplexer 14 is provided to an element 18 of gain −1 and to a first terminal of an adder 20. The absolute value of the output of multiplexer 16 is provided to a second input of adder 20. The respective output terminals of element 18 and of adder 20 are connected to a first and to a second input terminal of a calculation cell 22.

Calculation cell 22 includes a divider by two 24 having its input terminal connected to the second input terminal of calculation cell 22. Calculation cell 22 further includes a multiplexer 26 having a control terminal connected to a third input terminal of calculation cell 22, itself maintained at value 1. A first input terminal of multiplexer 26 receives the opposite of the output of divider 24. A second input terminal of multiplexer 26 receives the output of divider 24. Multiplexer 26 outputs the signal received on its first input terminal if its control terminal is at 0, and the signal received on its second input terminal otherwise. The first input terminal of an adder 28 is connected to the first input terminal of calculation cell 22 and its second input terminal is connected to the output terminal of multiplexer 26. The output terminal of adder 28 is connected to a first output terminal of calculation cell 22. A second output terminal of calculation cell 22 is connected to the output terminal of divider 24. The inverse of the sign of the signal generated by adder 28 is provided to a third output terminal of calculation cell 22.

The first, second, and third output terminals of calculation cell 22 are respectively connected to a first, a second, and a third input terminals of a cell 30 identical to cell 22. Similarly, a calculation cell 32 identical to cell 30 is connected next to cell 30, and a calculation cell 34 identical to cell 32 is connected next to cell 32. The third output terminals of cells 22, 30, 32, and 34 respectively generate bits PH(3), PH(2), PH(1), and PH(0) of the searched phase signal PH.

X-OR gate 12 compares the signs of the successive samples V(t) and V(t+1) and triggers the calculation of phase PH when the samples have different signs. Cells 22, 30, 32, and 34 are provided to operate with a first negative sample. To anticipate the case in which the first sample is positive, element 18 of gain −1 arbitrarily sets the value of first sample V(t) to the inverse of its absolute value. Adder 20 calculates the distance between samples V(t) and V(t+1). In calculation cell 22, half of the distance separating the samples is calculated, then added to the value of the first sample to calculate the value of half of the interval formed by samples V(t) and V(t+1). The intermediary value thus calculated forms the upper or lower end of the next search interval, according to whether it is of positive or negative sign. In each next calculation cell 30, 32, and 34, half of the distance separating the two ends of the search interval is calculated and added or subtracted to the intermediary value calculated by the preceding cell. The sign of the intermediary value calculated in calculation cell 22 enables determining the value of the most significant bit of the searched phase PH. Each next calculation cell enables refining by one bit the calculation of phase PH. The example shown enables calculating phase PH over four bits, but it is enough to increase this number to add calculation cells after the shown cell 34.

The circuit shown in FIG. 5 essentially is formed of elements performing asynchronous operations and the calculation time of the circuit shown in FIG. 5 may, in some operating conditions, be greater than the frequency of clock signal CK. A first solution may comprise of increasing the speed of the component used to form the circuit. A second solution may comprise separating the circuit into several blocks interconnected by D flip-flops rated by signal CK. Each D flip-flop memorizes the results of the calculations performed by the block connected to its input at each period of signal CK, and provides these results to the block connected to its output at the next period. This solution lengthens the calculation time of phase PH of signal V and it can thus only be used if phase PH is not used immediately after the 0 crossing of signal V. In the example of an optical disk reader, phase PH of signal V generated by a photosensitive cell of the read head is used to generate a position correction signal varying very slowly with respect to the frequency of signal CK. It is possible to delay the measurement of phase PH by several periods of clock CK to generate such a correction signal. D flip-flops rated by signal CK may for example be introduced in front of each input terminal of calculation cells 22, 30, 32, and 34 to ensure a proper operation of the circuit of FIG. 5.

Of course, the present invention is likely to have various alterations, modifications, and improvement which will readily occur to those skilled in the art. As an example, an embodiment of the present invention has been described in relation with a substantially sinusoidal signal V varying around zero between a predetermined negative value and a predetermined positive value, but those skilled in the art will easily adapt one embodiment of the present invention to a signal varying between any two predetermined values.

Embodiments of the present invention have been described in relation with a read head including four photosensitive cells A, B, C, and D, but those skilled in the art will readily adapt one embodiment of the present invention to a read head including a larger number of photosensitive cells, for example, six cells.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for measuring with a maximum error E a phase (PH) of a sinusoidal signal (V) of variable period T, of angular frequency $\omega=2\pi/T$, sampled with a sampling period T/r, where r is a non-necessarily integral number, in which the phase (PH) is calculated as a time at which a straight line crossing two consecutive samples located on either side of a median value of the signal reaches said median value, and including:

selecting number r from a range included between a value r0 and a value equal to from two to three times value r0 fulfilling the following relation for all possible values of T, and for t varying over a duration of a sampling period, between $-T/r0$ and 0:

$$E \geq \max\left[t - \frac{T}{r0} \cdot \frac{\text{round}(G \cdot \sin\omega t)}{\text{round}\left(\sin\left[G \cdot \omega \cdot t + \frac{2\pi}{r0}\right]\right) - \text{round}(G \cdot \sin\omega t)}\right]$$

round(x) being an integer closest to a real number x and G being equal to $2^i G_1$, where i is a number of bits on which samples of the sampled signal are coded, and where $G_1$ is a real term, included between 0 and 1, of correction of an amplitude of the sampled signal.

2. The method of claim 1 wherein the phase calculation includes:

a/ determining in which half of the sampling period separating said two consecutive samples the straight line reaches said median value, then delimiting a search interval equal to half the period thus determined, a most significant bit of a binary number representing the phase (PH) being equal to 0 if the search interval is a first half of said period and to 1 otherwise; and b/ repeating a number j–1 of times determining in which half of the search interval the straight line reaches said median value, then restricting the search interval to the determined half of the search interval, a bit of the binary number, less significant than a bit previously calculated, being equal to 0 if the straight line reaches said median value in the first half of the search interval and to 1 otherwise.

3. A circuit for measuring, in a form of a binary number of j bits with a maximum error E, a phase (PH) of a sinusoidal signal (V) of variable period T, of angular frequency $\omega=2\pi/T$, sampled with a sampling period T/r, where r is a non-necessarily integral number, chosen to be included in a range from a value r0 to two or three times this value r0, the value r0 fulfilling the following relation for all possible periods of T, and for t varying by a duration of a sampling period, between $-T/r0$ and 0:

$$E \geq \max\left[t - \frac{T}{r0} \cdot \frac{\text{round}(G \cdot \sin\omega t)}{\text{round}\left(G \cdot \sin\left[\omega \cdot t + \frac{2\pi}{r0}\right]\right) - \text{round}(G \cdot \sin\omega t)}\right]$$

round(x) being an integer closest to a real number x and G being equal to $2^i G_1$, where i is a number of bits on which samples of the sampled signal are coded and where $G_1$ is a real term, included between 0 and 1, of correction of an amplitude of the sampled signal, the circuit including:

an initialization cell receiving said sampled signal and providing, when two successive samples are of different signs, an inverse of an absolute value of a first sample of the two successive samples on a first output terminal and a first sum of absolute values of the two successive samples on a second output terminal;

a first calculation cell having first and second input terminals respectively coupled to the first and second output terminals of the initialization cell, a first output terminal of the first calculation cell providing a second sum of the inverse of the absolute value of the first sample received on its first input terminal and of half the first sum received on its second input terminal, a second output terminal of the first calculation cell providing said half of the first sum, and a third output terminal of the first calculation cell providing an inverse of a sign of said second sum; and a number j–1 of next calculation cells each having first, second, and third input terminals respectively connected to the first, second, and third output terminals of a preceding calculation cell, a first output terminal of each next calculation cell providing a third sum of a first input received on its first input terminal and of half of a second input received on its second input terminal if its third input terminal receives a signal equal to 1 and providing a fourth sum of the first input received on its first input terminal and of an inverse of half the second input received on its second input terminal otherwise, a second output terminal of each next calculation cell providing said half of the second input, and a third output terminal of each next calculation cell providing an inverse of a sign of said fourth sum.

4. The circuit of claim 3 wherein the initialization cell includes:
a D flip-flop rated by a clock signal, receiving said sampled signal;
an X-OR gate receiving as inputs the signs of the two consecutive samples present at an input and at an output of the D flip-flop;
a first multiplexer coupled to provide either the output of the D flip-flop or 0, according to whether an output of the X-OR gate is equal to 1 or to 0 and a second multiplexer coupled to provide either the input of the D flip-flop or 0, according to whether the output of the X-OR gate is equal to 1 or to 0, an absolute value of an output of the first multiplexer being provided to an element of gain −1 and to a first input of a first adder, an absolute value of an output of the second multiplexer being provided to a second input of the first adder, respective outputs of the element of gain −1 and of the first adder being coupled to the first and second output terminals of the initialization cell.

5. The circuit of claim 3 wherein the first calculation cell includes:
a divider by two having an input coupled to the second input terminal of the first calculation cell;
a third multiplexer coupled to provide either an output of the divider or an inverse of the output of the divider according to whether a signal received by a third input terminal of the first calculation cell is equal to 1 or to 0;
a second adder to add the signals received from the first input terminal of the first calculation cell and from an output of the third multiplexer, an output of the second adder being coupled to a first output terminal of the first calculation cell, the second output terminal of the first calculation cell being coupled to the output of the divider, an inverse of a sign of a signal generated by the second adder being provided to the third output terminal of the first calculation cell, and the third input terminal of the first calculation cell being maintained at value 1.

6. The circuit of claim 5 wherein the next calculation cells each have a same structure as the first calculation cell.

7. The circuit of claim 6 wherein the third output terminals of the first calculation cell and of the next calculation cells respectively provide a most significant bit and next most significant bits of the phase (PH).

8. The circuit of claim 3 wherein number i is equal to 8, number j is equal to 4, error E is equal to one sixteenth of the sampling period, and number r ranges between 3.4 and substantially 10.

9. A method to measure a phase of a sinusoidal signal of angular frequency $\omega=2\pi/T$, the method comprising:
sampling the sinusoidal signal with a sampling period T/r, where T is a variable period and r is a non-necessarily integral number;
calculating the phase as a time at which a straight line crossing two consecutive samples of the sinusoidal signal, located on either side of a median value of the sinusoidal signal, reaches the median value; and
selecting r from a range between a certain value of r to a multiple of the certain value, in a manner that a maximum error of measurement of the phase is based at least in part on a real-number integer approximation, a number of bits on which the samples are coded, and a corrective term for an amplitude of the sampled sinusoidal signal.

10. The method of claim 9 wherein calculating the phase includes:
determining in which half of the sampling period separating said samples the straight line reaches the median value, then delimiting a search interval equal to half the sampling period thus determined, a most significant bit of a binary number, representing the phase, being equal to 0 if the search interval is in the first half of the sampling period and to 1 otherwise; and
repeating determining in which half of the search interval the straight line reaches the median value, then restricting the search interval to the determined half of the search interval, a bit of the binary number, less significant than the bit previously calculated, being equal to 0 if the straight line reaches said value in the first half of the search interval and to 1 otherwise.

11. The method of claim 9, further comprising:
determining a minimum sampling frequency that can be used to obtain accuracy within the maximum error of measurement; and
selecting a sampling frequency close to this minimum.

12. An apparatus to measure a phase of a sampled sinusoidal signal, the apparatus comprising
an Initialization cell to receive the sampled signal and to provide, when two successive samples are of different signs, an inverse of an absolute value of a first sample on a first output terminal and a first sum of the absolute values of the two samples on a second output terminal;
a first calculation cell having first and second input terminals respectively coupled to the first and second output terminals of the initialization cell, the first calculation cell having a first output terminal to output a second sum of the inverse absolute value received on its first input terminal and of half the first sum of the absolute values received on its second input terminal, the first calculation cell having a second output terminal to output the half of the first sum of the absolute values, the first calculation cell having a third output terminal to output an inverse of a sign of the second sum; and
a plurality of next calculation cells each having first, second, and third input terminals respectively coupled to first, second, and third output terminals of a preceding calculation cell, each of the next calculation cells configured to provide its first output terminal with a third sum of a value received on its first input terminal and of half of a value received on its second input terminal if its third input terminal receives a signal equal to 1, each of the next calculation cells configured to provide a fourth sum of a value received on its first input terminal and of an inverse of half a value received on its second input terminal otherwise, each of the next calculation cells configured to provide the half of the value received on its second input terminal to its second output terminal and to provide an inverse of a sign of the third or fourth sums to its third output terminal.

13. The apparatus of claim 12 wherein the initialization cell includes:
- a flip-flop to receive the sampled signal;
- a logic device coupled to the flip-flop and having input terminals to receive signs of values present at input and output terminals of the flip-flop;
- a first multiplexer, coupled to the logic device and to the flip-flop, to provide either an output of the flip-flop or 0 at its output terminal, according to whether an output of the logic device is equal to 1 or to 0;
- a second multiplexer, coupled to the logic device and to the flip-flop, to provide either an input of the nip-flop or 0 at its output terminal, according to whether the output of the logic device is equal to 1 or to 0;
- an element of gain −1; and
- a first adder having a first input terminal coupled to the output terminal of the first multiplexer to receive an absolute value of an output at the output terminal of the first multiplexer, the first adder having a second input terminal coupled to the output terminal of the second multiplexer to receive an absolute value of an output at the output terminal of the second multiplexer, respective output terminals of the element of gain −1 and of the first adder being connected to first and second output terminals of the initialization cell.

14. The apparatus of claim 13 wherein the logic device comprises an X-OR gate, and wherein the flip-flop comprises a D flip-flop.

15. The apparatus of claim 12 wherein the first calculation cell includes:
- a divide-by-two device having an input terminal coupled to the second input terminal of the first calculation cell;
- a third multiplexer coupled to provide either an output of the divide-by-two device or an inverse of the output of the divide-by-two device according to whether the signal received by a third input terminal of the first calculation cell is equal to 1 or to 0; and
- a second adder to add signals received from the first input terminal of the first calculation cell and from an output terminal of the third multiplexer, an output terminal of the second adder being coupled to the first output terminal of the first calculation cell, the second output terminal of the first calculation cell being coupled to an output terminal of the divide-by-two device, an inverse of a sign of a signal generated by the second adder being provided to the third output terminal of the first calculation cell, the third input terminal of the first calculation cell being maintained at value 1.

* * * * *

UNITED STATES PATENT AND TRADEMARK OFFICE
CERTIFICATE OF CORRECTION

PATENT NO. : 7,154,943 B2 Page 1 of 1
APPLICATION NO. : 10/273016
DATED : December 26, 2006
INVENTOR(S) : Patrick Simeoni It is certified that error appears in the above-identified patent and that said Letters Patent is hereby corrected as shown below:

Title Page
Should include -- (30) Foreign Application Priority Data
October 17, 2001...............(FR) 01/13372 --

Signed and Sealed this

Eighth Day of April, 2008

JON W. DUDAS
*Director of the United States Patent and Trademark Office*